United States Patent

Zeigler

[11] 4,049,099
[45] Sept. 20, 1977

[54] MOTORCYCLE SAFETY HUB

[76] Inventor: Joseph Spence Zeigler, 166 Cullinane Drive, Marlborough, Mass. 01752

[21] Appl. No.: 663,261

[22] Filed: Mar. 3, 1976

[51] Int. Cl.² ............... F16D 11/00; F16D 13/04; F16H 57/00
[52] U.S. Cl. .................................. 192/46; 74/405
[58] Field of Search ............... 192/46, 41 R; 74/405

[56] References Cited

U.S. PATENT DOCUMENTS

| 1,362,591 | 12/1920 | Von Beaulieu | 192/46 X |
|---|---|---|---|
| 1,466,214 | 8/1923 | Thompson | 192/46 X |
| 3,463,280 | 8/1969 | Hoffman et al. | 192/46 X |
| 3,638,774 | 2/1972 | Burch et al. | 192/46 X |
| 3,782,355 | 1/1974 | Hammon | 192/46 X |

Primary Examiner—Leonard H. Gerin
Attorney, Agent, or Firm—Ross, Ross & Flavin

[57] ABSTRACT

A safety hub mechanism which automatically disconnects a driven wheel from a drive train in the event of a mechanical failure of the drive train, thus allowing a continued rotation of the driven wheel.

1 Claim, 6 Drawing Figures

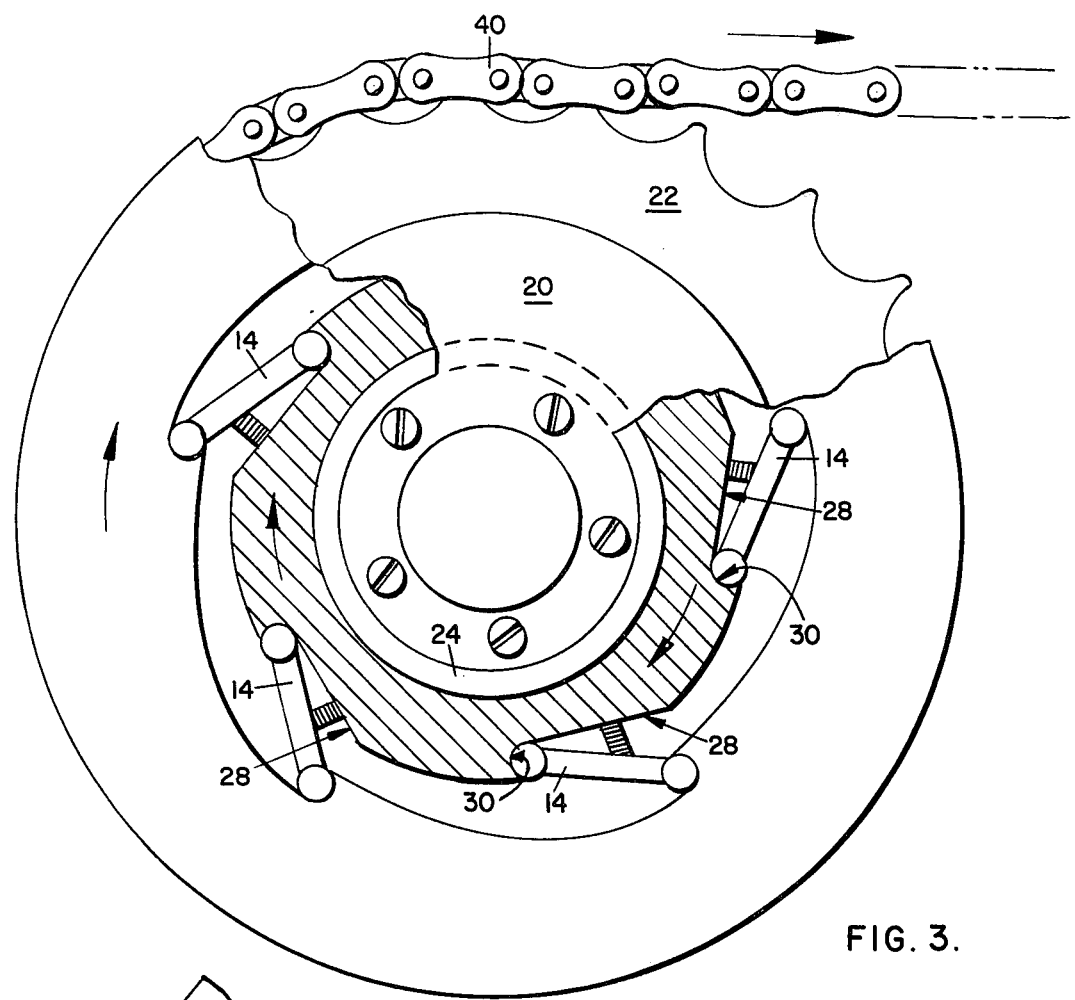
FIG. 3.
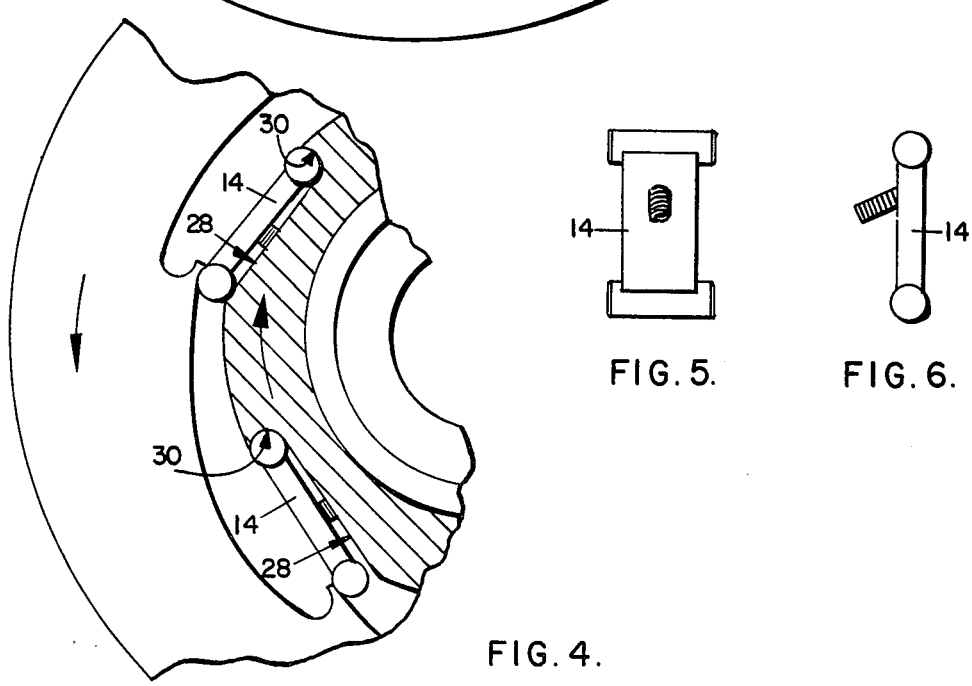
FIG. 5.   FIG. 6.
FIG. 4.

MOTORCYCLE SAFETY HUB

The invention involves a mechanism having a capacity for automatically changing its condition of operation from a primary locked or operative mode, wherein a rotatable driving member is locked to a rotatable driven member, to a secondary unlocked or failure mode, wherein the driven member is unlocked from the overrides the driving member so as to allow a rotation of the driving member independently of the load driven member.

It has particular application in the case of a motorcycle. As known, the rear wheel is driven, through a drive train, by the engine. The invention serves its purpose in the event of a sudden, unanticipated stoppage or an interruption in the normal drive train or engine operation when a continued rear wheel rotation is the desideratum, lest the operator lose control.

Such unwelcome stoppage of rear wheel rotation conceivably can be brought about by such as engine overheating, a lock up of bushing or bearing in the transmission, a breakage of a transmission or like component with any resultant debris inducing jamming, a jumping of a chain from a sprocket, or like trouble situation.

Engine seizure or lock up is relatively uncommon in automobiles but is a well-known frequent occurrence in the case of a motorcycle. It can and does occur, usually without warning and usually with the disastrous effect of bringing the rear wheel to an instantaneous stop, wherefore the motorcycle usually goes into a slide and crashes to the ground, at the risk of serious injury to its operator.

Further, when one locks an automobile drive train, the differential is called into play and one wheel is usually allowed to rotate so as to allow some degree of vehicle control. Contrariwise, with a motorcycle, there being only a single driving wheel, little or no control is possible when that all-important wheel is suddenly stopped in its rotation.

The racing motorcyclist particularly has to recognize this omnipresent danger due to the extremes in operating conditions under which he serves. Experienced riders may often be observed with one hand poised above the clutch lever, ready to squeeze the lever and release the drive train upon sensing that seizure is about to ensue.

The mechanism hereof precludes rear wheel locking, irrespective of the drive train forces arising to act thereon. It offers a capacity for override so that the driven rear wheel is free to rotate irrespective of any force or forces creating the seizing or locking condition, and is brought into play only in the event that sprocket loading is suddenly stalled from whatever trouble condition, be it a seized engine or locked transmission or otherwise, may have suddenly and unexpectedly arisen.

A primary advantage, realized in both the driving (accelerating) and the drag (engine-breaking) modes, derives from the ability of the device to provide limits to the torque delivered to the rear wheel during normal drive train operation.

In the drag mode, the device may be adjusted to slip when the clutch is engaged during greatly diverse speeds of the engine and rear wheel, such as when the operator shifts the transmission to a lower gear too rapidly. This is a particular safety feature in the case of a four-stroke powered vehicle, since such action without the safety hub hereof could easily cause a loss of traction, hence a loss of control, due to excessive rear-wheel braking.

A secondary advantage sees the elimination of so-called rear-wheel hop, a phenomenon particularly experienced by, but not limited to, motorcycle racers for whom heavy breaking is normal. This phenomenon is instigated by erratic power pulses from the engine to the rear suspension when the vehicle is in the braking mode. The result is a bouncing rear wheel which at worst causes a loss of control and at best prevents optimal braking. Because the mechanism hereof can be adjusted to limit the erratic torque input from the engine, rear-wheel hop is eliminated, allowing smooth and controlled braking to be attained.

As a further salient advantage of the mechanism, it is to be noted that drag adjustments can be made so that the drag can be varied to any desired pressure even to the extent that the outer drum is totally free of any drag as for instance in the case of a transfer from the operative mode to the failure mode. Pre-loading may be adjusted so that slight slippage is allowed to a degree adequate to accommodate to the situation where the operator may downshift harshly and thereby prevent that situation of a momentary stoppage or even slowing down of wheel rotation. Such slippage, under normal downshifting and braking, has the effect of eliminating the rear-wheel hop. Such pulses occur as the engine, with the throttle closed, is driven by the rear wheel faster than is indicated by the throttle opening. The engine may randomly accumulate enough charge to provide power to the rear wheel. Under deceleration, this random change from the rear wheel driving the engine to momentary drive from the engine induces a jerk into the suspension system, causing the rear wheel to hop. At this point, the safety hub being in a slight slip mode, this jerk is absorbed by the slutch and the rear wheel hop is eliminated.

The device can be readily applied to existing machines without unreasonable expense and can be easily fitted as standard equipment by any machine manufacturer.

In the drawings:

FIG. 3 is a fragmentary view in side elevation, with certain portions in section, showing the preferred embodiment of the invention in the operative or driving mode;

FIG. 4 is a fragmentary view in side elevation showing the apparatus in the failure or dragging mode; and FIGS. 5 and 6 are top and side views respectively of the driving dogs and related positioning springs.

Figure 1:
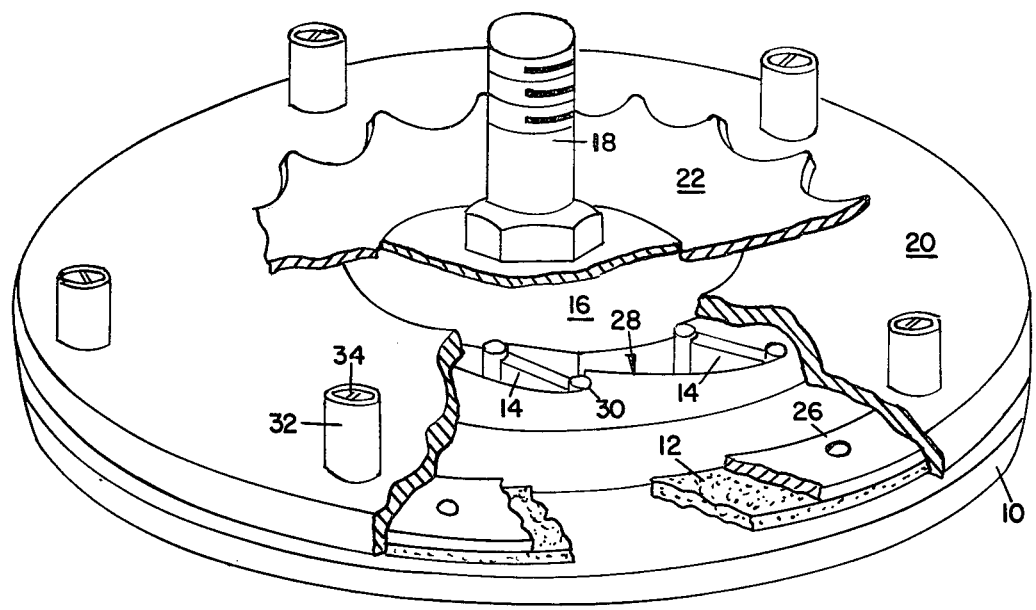
FIG. 1 is an isometric view of the apparatus with parts broken away for purposes of clarity.
Figure 2:
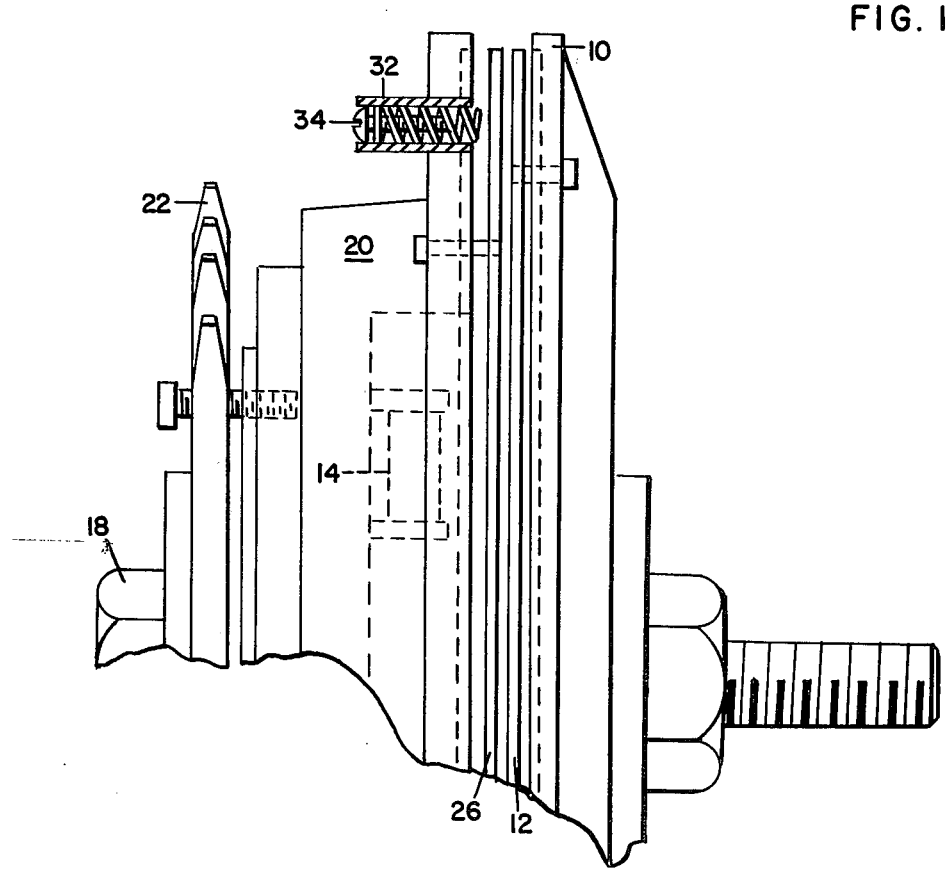
FIG. 2 is a view in end elevation of the FIG. 1 apparatus.

A driven plate 10 is mounted integrally with the conventional motorcycle rear wheel brake drum hub assembly and supports an annular friction disc 12 and a plurality of driving dogs 14 which are each pivotally mounted at the inboard end on a driving dog mounting boss 16 circumscribing and fixed to the rear wheel axle 18.

A driving plate 20 mounts a rear wheel driving sprocket 22 and is mounted rotatably relative to driven plate 10, being suitably journalled by means of a bearing 24.

Driving plate 20 mounts a clutch plate 26 and is configured to define a plurality of circularly-arranged equi-spaced ramps 28, with the adjacent ramps being separated by ramp stop receivers 30 for the reception of driving dogs 14 which ride up on respective adjacent ramps and drop into the next respective adjacent ramp stop receivers.

Clutch plate 26 is urged against fricition disc 12 by means of a plurality of circumferentially-arranged clutch pressure springs 32.

In both the driving and failure modes, clutch plate 26, when so urged against friction disc 12, retards the motion of driving plate 20 and driven plate 10 relative to each other.

Clutch pressure springs 32 may be adjusted by pressure by means of respective clutch spring pressure adjusting screws 34.

The retardation of relative motion between driving plate 20 and driven plate 10 by means of the clutch plates serves two purposes: first, it prevents, in the failure mode, complete free-wheeling and allows a measure of engine braking when the throttle is closed, and second, it cushions the impact of driving dogs 14 against the ramp stops on driving plate 20.

In the FIG. 3 driving mode, driving dogs 14 are driven up on the ramps as the chain 40 turns driving plate 20 relative to driven plate 10 until driving dogs 14 reach the ramp stops, at which moment further relative motion between the plates is precluded. That is, the dogs, once disposed against the stops, prevent further relative movement of the plates.

The mechanism is thus locked in the drive mode until a reversal of torque input from chain 40 occurs. At such time, driving plate 20 reverses its motion relative to driven plate 10.

Driving dogs 14 back up the ramps and over the next stop, allowing the rear wheel to free wheel, retarded only by the clutch action, as aforesaid.

Driving dogs 14 are held against the ramps on driving plate 20 by positioning springs 60 and by the centrifugal force acting on the ends of the dogs as the assembly spins.

The mechanism has a positive mechanical lock-up in the drive mode offering the advantage that the device need not be, and in fact, can not be adjusted in the drive mode. Thus it may be installed on various displacement size motocycles without any need for readjusting the drive mode. Also, the lock-up in the drive mode is not affected by any external conditions.

The safety-hub may be seen to comprise two systems: first, a friction clutch, encircling the lock-up device, which is adjusted to provide a drag in the failure mode or to allow for the push-starting of the vehicle and to cushion the lock-up means as it retards slippage such that slamming into lock-up as the two plates advance is precluded; and second, a positive lock-up means (that is, outwardly spring-loaded dogs, which are hinged on the plate attached to the wheel and received on the plate attached to the sprocket, move on ramps inclined inward toward the center of the wheel in the direction of normal rotation and end in stops) so that when the dogs reach the end of the ramps and are disposed against the stops, further motion between the plates is precluded so long as the device is in the drive mode. When seizure occurs, the dogs retreat away from the stops, as the input torque has then been reversed, and the ramps lead the dogs across the tops of the stops, allowing a freewheeling between the plates which is retarded only by the action of the clutch.

Adjustments can be made such that the drag can be adjusted to any desired pressure even to the extent that the outer drum would be totally free of any drag in the instance of a transfer from operative to failure mode. For example, the pre-loading may be adjusted such that slippage is allowed to a slight degree so as to accommodate to that situation where an operator may downshift harshly and thereby prevent that situation of a momentary stoppage or even slowing down of wheel rotation.

This slippage under normal downshifting and breaking also has the effect of eliminating the rear-wheel hop. The erratic pulses causing same occur as the engine, with throttle closed, is driven by the rear wheel faster than is indicated by the throttle opening. The engine may randomly accumulate enough charge to provide power to the rear wheel. Under deceleration, this random change from the rear wheel driving the engine (whereat the lower run of the chain is taut) to momentary drive from the engine (whereat the upper run of the chain is taut) induces a jerk into the suspension system, causing rear wheel hop. But because, at this point, the safety hub is in a slight slip mode, this jerk is absorbed by the clutch and the wheel hop is eliminated. That is, when in the limited slip mode, the dogs are not disposed against the ramp stops and the device is capable of limiting torque input in the drive mode. But this is a temporary condition, for if the torque continues, the dogs will seat against the stops and no further relative moement is possible.

I claim:

1. In a motorcycle safety mechanism for automatically changing from a primary operative mode to a secondary failure mode upon any malfunction leading to a stoppage in the drive train, the combination of:
    a rotatable driven plate mounted integrally with the rear wheel brake drum hub assembly of the motorcycle,
    a friction disc supported by the driven plate,
    a plurality of spring-loaded driving dogs each pivotally mounted on a boss of the rear wheel axle of the motorcycle,
    a rotatable driving plate mounting the rear wheel driving sprocket and mounted rotatably relative to the driven plate,
    an annular clutch plate mounted on the driving plate and having a plurality of circularly-arranged equispaced ramps inwardly inclined in the direction of normal rotation and each terminating in a dog receiving stop,
    adapted and arranged while the mechanism is in primary operative mode for the preclusion of relative rotation of the driven and driving plates with the dogs each in confrontation with a respective stop and while in a state of seizure in a secondary failure mode for the dogs to be withdrawn from the respective stops under the influence of the reversed input torque and led across the stops allowing free wheeling between the plates.

* * * * *